United States Patent [19]
Horikawa

[11] Patent Number: 5,463,004
[45] Date of Patent: Oct. 31, 1995

[54] PROCESS FOR POLYMERIZING CONJUGATED DIENES WITH LITHIUM-TIN-NITROGEN INITIATORS

[75] Inventor: Yasuo Horikawa, Tokyo, Japan

[73] Assignee: Bridgestone Corporation, Tokyo, Japan

[21] Appl. No.: 217,632

[22] Filed: Mar. 25, 1994

[30] Foreign Application Priority Data

Mar. 25, 1993 [JP] Japan .................................. 5-066850

[51] Int. Cl.$^6$ .............................. C08F 4/48; C08F 4/58; C08F 36/06
[52] U.S. Cl. .................... 526/176; 526/180; 526/217; 526/221; 526/236; 526/335; 526/340
[58] Field of Search ..................... 526/176, 340, 526/180

[56] References Cited

U.S. PATENT DOCUMENTS

| | | | |
|---|---|---|---|
| 3,426,006 | 2/1969 | Nützel | 526/340 |
| 3,935,177 | 1/1976 | Muller | 526/180 |
| 4,397,994 | 8/1983 | Takeuchi | 525/332.3 |
| 5,268,439 | 12/1993 | Hergenrother | 526/340 |

*Primary Examiner*—Fred Zitomer
*Attorney, Agent, or Firm*—Sughrue, Mion, Zinn, Macpeak & Seas

[57] ABSTRACT

A method for preparing a polymer having low hysteresis loss value, good breaking properties and good processability with good productivity is provided by adding a tin compound during the propagation step of polymerization of a conjugated diene and/or an aromatic vinyl hydrocarbon. Polymers produced in accordance with this method have high molecular weight and star-shaped structures with branches having the same or different molecular weight.

22 Claims, No Drawings

PROCESS FOR POLYMERIZING CONJUGATED DIENES WITH LITHIUM-TIN-NITROGEN INITIATORS

FIELD OF THE INVENTION

The present invention relates to a process for preparing a polymer having a tin atom in its main chain.

BACKGROUND OF THE INVENTION

Lately, rubbers used for tires must have reduced hysteresis loss values in order to reduce energy consumption. Thus, natural rubbers (NR), polyisoprene rubbers (IR) and polybutadiene rubbers (BR) are used because they have low hysteresis loss values.

Some synthetic rubbers with lower hysteresis loss values are prepared by coupling after being formed by polymerization using organolithium compounds, the coupling being carried out with halogenated tin compounds (JP-A-57-55912). These polymers have good properties, in particular, reduced energy consumption.

In this method, a tin compound as a coupling agent, usually, is added after polymerization is completed, since this coupling process deactivates the active end of the polymer. If the polymer end is deactivated, unreacted monomers remain without reacting at all so that the molecular structure and the molecular weight of the resulting polymer is fixed at the time when the tin compound is added. So from an economical and molecular engineering point of view, the tin compound must be added at the end of the polymerization.

Another method for lowering the hysteresis loss value includes the use of polymers having a tertiary amine group at the end of the chains (JP-A-50-79590, JP-A-52-22484, etc.). In this process, initiators, for example, amide compounds of alkali metals, such as lithium dipropylamide, or cyclic lithium imide compounds, such as lithium piperidide, are prepared separately before use. In these processes, hysteresis loss values are lowered by introducing tin atoms into the polymers through coupling.

However, the processes described above require a coupling step after polymerization, which prevents continuous polymerization, therefore, reducing productivity and increasing cost. Also, the continuous processes known to those skilled in the art do not provide a polymer having both sufficiently improved properties and good processability. Moreover, these processes can not achieve 100 percent of coupling efficiency so that the resulting polymers do not have sufficiently good properties. Furthermore, the resulting coupled polymers have very high molecular weights which reduce processability.

SUMMARY OF THE INVENTION

An object of the present invention is to provide a process for preparing a polymer having a tin atom in the main chain at a high modification efficiency with good productivity and a polymer which has a low hysteresis loss value and improved breaking properties and processability. The process of the invention includes polymerization of a conjugated diene compound or copolymerization of a conjugated diene compound and an aromatic vinyl compound in a hydrocarbon solvent using a lithium compound as an initiator. A tin compound having either formula (A) or formula (B) is added at any time during propagation from just after initiation of polymerization until the conversion reaches 100 %.

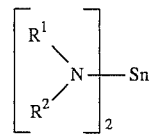

wherein $R^1$ and $R^2$ may be same or different and each represents an aliphatic hydrocarbon group containing 1 to 20 carbon atoms, an aromatic hydrocarbon group containing 5 to 20 carbon atoms or a cycloaliphatic hydrocarbon group containing 3 to 20 carbon atoms.

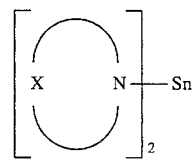

wherein X represents one of the following hydrocarbon groups:

X - I: a saturated group having the formula $(CR^3R^4)_n$ that forms a ring with the N in formula (B);

X - II: a saturated group having the formula $(CR^5R^6)_m$-Y-$(CR^5R^6)_l$ that forms a ring with the N in formula (B), wherein Y is $NR^7$ or O;

X - III: an unsaturated group having a carbon-carbon double bond that forms a ring with the N in formula (B), preferably having the formula $(CR^3R^4)_n$ or $(CR^5R^6)_m$-Y-$(CR^5R^6)_l$ as described above;

wherein $R^3$, $R^4$, $R^5$, and $R^6$, which may be the same or different, each independently represents a hydrogen atom, an aliphatic hydrocarbon group containing 1 to 10 carbon atoms, an aromatic hydrocarbon group containing 5 to 10 carbon atoms, and a cycloaliphatic hydrocarbon group containing 3 to 10 carbon atoms, $R^7$ is an aliphatic hydrocarbon group containing 1 to 10 carbon atoms, an aromatic hydrocarbon group containing 5 to 10 carbon atoms, and a cycloaliphatic hydrocarbon group containing 3 to 10 carbon atoms, n is an integer between 3 and 10, and m and l are each an integer, the sum of which is from 2 to 9.

With regard to the interaction between an active end of a polymer chain and a tin compound and the reactivity of the polymerization system, the present inventor has found that a compound represented by formula (A) or formula (B) (which will be represented as $(R_2N)_2Sn$ from now on) will not deactivate the active end of the polymer even when it is added during the propagation part of the polymerization, but instead $(R_2N)_2Sn$ will form a tin-carbon bond to provide a branched or stared polymer having a high molecular weight. The polymerization mechanism is not elucidated entirely yet, but it can be regarded as following equation (1):

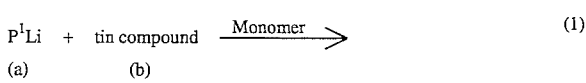

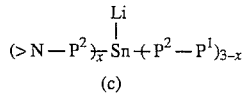

($P^1$ and $P^2$ represent a polymer before and after addition of a tin compound respectively. The molecular weight of three $P^2$'s may be the same or different. The symbol x is an integer from 0 to 3.)

When a tin compound (b) is added to the polymer which is propagating, the coupling reaction occurs and a polymer containing a tin atom is formed. This tin atom gives an active site to continue polymerization to form a star-shaped polymer (c) including $P^2$. The polymer (c) can be divided into four groups as follows: (1) all three branches are $P^1-P^2$, two of them are $P^1-P^2$, and one is $>N-P^2$, (3) one is $P^1-P^2$ and the other two are $>N-P^2$, and (4) all three are $>N-P^2$. The polymer (c) in usual cases is (2), (3), or a mixture of them (5).

Since the polymer (c) has an active end (Li), it can react with a modifier. By contacting the active end with a modifier, a novel and useful polymer can be obtained.

Furthermore, by changing the timing and the amount of the addition of the tin compound, the molecular weight of each branch and also of the entire polymer can be set as desired.

The tin-carbon linkage in the polymer (c) can be broken easily during compounding by the presence of stearic acid or heat to produce a polymer composition with polymers having desirable properties such as reduced hysteresis loss values. Also, since the polymers in accordance with present invention may have $P^1-P^2$ and $>N-P^2$ with a large 1 2 difference between the molecular weights, a polymer having an excellent processability can be obtained. Furthermore, the nitrogen atom of $>N-P^2$ can give the polymer a reduced hysteresis loss.

For example, when butadiene and styrene are polymerized randomly with n-butyllithium as an initiator and a diamidetin compound is added during propagation, a branched random styrene-butadiene copolymer (SBR) is obtained as the polymerization proceeds. A vulcanized rubber compound made from a polymer prepared in accordance with the present invention has a very low hysteresis loss value. Furthermore, the modifying efficiency of the present invention can reach 100 percent so that good processability can be maintained.

In general, if a tin compound is added during the propagation part of the polymerization, the active end of the polymer chain is deactivated so that unreacted monomers remain. This leads to the formation of an unfavorably low molecular weight polymer or even an oligomer. In contrast, each of the polymers of the present invention has a branched or stared structure because polymerization proceeds even after the tin compound is added. While not wishing to be bound by theory, it is believed that this ability to have a polymerization site even after the addition of the tin compound is due to the interaction between a compound having an amide-tin, an allyl-tin, or a benzyl-tin-type bond and stannyllithium.

As described above, an object of the present invention is to provide a process to prepare a polymer which has low hysteresis loss value and shows improved breaking properties and processability.

DETAILED DESCRIPTION OF THE INVENTION

The term "polymerization" as used herein includes homopolymerization of a conjugated diene compound; copolymerization of a conjugated diene compound and an aromatic vinyl compound; as well as homopolymerization of an aromatic vinyl compound. Also, the term "polymer" includes a polymer of a conjugated diene compound; a copolymer of a conjugated diene compound and an aromatic vinyl compound; as well as a polymer of an aromatic vinyl compound.

The process in accordance with the present invention includes an initiation step with a lithium compound in a hydrocarbon solvent and a propagation step in which a tin compound is incorporated into the main chain of the polymer. The tin compounds used are compounds having either formula (A) or formula (B).

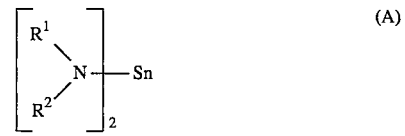
(A)

wherein $R^1$ and $R^2$ may be the same or different and each represents an aliphatic hydrocarbon group containing 1 to 20 carbon atoms, an aromatic hydrocarbon group containing 5 to 20 carbon atoms or a cycloaliphatic hydrocarbon group containing 3 to 20 carbon atoms.

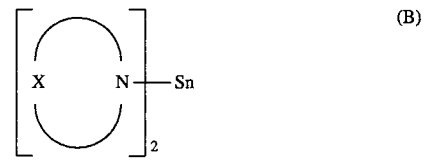
(B)

wherein X is one of the following hydrocarbon groups:

X - I: a saturated group having the formula $(CR^3R^4)_n$ that forms a ring with the N in formula (B);

X - II: a saturated group having the formula $(CR^5R^6)_m$-Y-$(CR^5R^6)_1$ that forms a ring with the N in formula (B), wherein Y is $NR^7$ or O;

X - III: an unsaturated group having a carbon-carbon double bond that forms a ring with the N in formula (B), the unsaturated group preferably having the formula $(CR^3R^4)_n$ or $(CR^5R^6)_m$-Y-$(CR^5R^6)_1$ as described above;

wherein $R^3$, $R^4$, $R^5$, and $R^6$, which may be the same or different, each independently represents a hydrogen atom, an aliphatic hydrocarbon group containing 1 to 10 carbon atoms, an aromatic hydrocarbon group containing 5 to 10 carbon atoms, and a cycloaliphatic hydrocarbon group containing 3 to 10 carbon atoms, $R^7$ is an aliphatic hydrocarbon group containing 1 to 10 carbon atoms, an aromatic hydrocarbon group containing 5 to 10 carbon atoms, and a cycloaliphatic hydrocarbon group containing 3 to 10 carbon atoms, n is an integer between 3 and 10, and m and 1 are each an integer, the sum of which is from 2 to 9.

The tin compounds in accordance with formula (A) above are compounds which include a secondary amino residue and tin, wherein, preferably, each of $R^1$ and $R^2$ is an aliphatic hydrocarbon group containing 1 to 10 carbon atoms, an aromatic hydrocarbon group containing 5 to 10 carbon atoms, or a cycloaliphatic hydrocarbon group containing 3 to 10 carbon atoms, more preferably, each of $R^1$ and $R^2$ is an aliphatic hydrocarbon group containing 1 to 10 carbon atoms.

Any suitable secondary amide may be used in the tin compounds of formula (A) of the present invention. Examples of suitable secondary amines include dimethylamine, diethylamine, dipropylamine, di-n-butylamine, diisobutylamine, dipentylamine, dihexylamine, diheptylamine, dioctylamine, diarylamine, dicyclohexylamine, butylisopropylamine, dibenzylamine, methylbenzylamine, methylhexylamine, and ethylhexylamine. Other suitable secondary amines will be apparent to one skilled in the art.

The tin compound in accordance with formula B are compounds which include an imine residue and tin.

Any suitable imine compound which forms a nitrogen containing ring may be used to form the imine residue including:

a) imine compounds with saturated hydrocarbon groups having the formula $(CR^3R^4)_n$ where preferably, $R^3$ and $R^4$ are each a hydrogen atom or an aliphatic hydrocarbon with 1 to 8 carbons, and n is 3 to 10, more preferably, $R^3$ and $R^4$ are each a hydrogen atom or an aliphatic hydrocarbon with 1 to 5 carbons, and n is 3 to 8. Examples of imine compounds in this category include the following: aziridine, azetidine, pyrrolidine, piperidine, 2-methylpiperidine, 3-methyl-piperidine, 4-methylpiperidine, 3,5-dimethylpiperidine, 2-ethylpiperidine, hexamethyleneimine, heptamethyleneimine and coniine;

b) imine compounds with saturated hydrocarbon groups having the formula $(CR^5R^6)_m$-Y-$(CR^5R^6)_1$ where preferably, $R^5$ and $R^6$ are each a hydrogen atom or an aliphatic hydrocarbon with 1 to 5 carbons, $R^7$ is an aliphatic hydrocarbon with 1 to 5 carbons and the sum of m and 1 is from 3 to 5, more preferably, $R^5$ and $R^6$ are each an hydrogen atom, $R^7$ is an aliphatic hydrocarbon with 1 to 5 carbons and the sum of m and 1 is from 3 to 5. Examples of imine compounds in this category include the following: morpholine, N-methylpiperazine, N-ethylpiperadine, N-methylimidazolidine, and N-ethylimidazolidine; and c) imine compounds having a carbon-carbon double bond, the ring preferably being a ring having an unsaturated hydrocarbon group of the formula $(CR^3R^4)_n$ or $(CR^5R^6)_m$-Y-$(CR^5R^6)_1$, as described above. Examples of imine compounds in this category include oxazine, pyrroline, pyrrole, azepine.

In both formula (A) and formula (B), each secondary amine residue and imine residue may be the same or different. And the tin compound added to the polymerization system may be a single component or mixture of any combination of these.

Examples of the tin compound in accordance with formula (A) include bis(diethylamide)tin, bis(dimethylamide)tin, bis(aziridide)tin, bis(pyrrolidide)tin, bis(hexamethyleneimide)tin and (tetramethyleneimide)(hexamethyleneimide)tin.

Examples of the tin compound in accordance with formula (B) include bis(N-methylpiperazide)tin, bis(N-methylimidazolidide)tin, bis(pyrrolide)tin and bis(oxazide)tin.

The amount of tin compound used for modification in accordance with the present invention should be between 0.1 to 2 mole equivalents per 1 mole equivalent of lithium at the active ends. The molar ratio of the tin compound to lithium at the active end largely affects the activity of the polymer ends, the content of tin-carbon linkage in the polymer and the molecular weight of the polymers. With a lower level of the tin compound, the number of tin-carbon linkages per polymer chain is not enough in order to obtain desirable physical properties, even though some tin-carbon linkages are formed. With a higher level of the tin compound, the activity of the polymer end is unfavorably reduced. This affects the physical properties of the resulting polymers and, further, the vulcanite. If the amount of tin compound is less than 0.1 mole equivalents per 1 mole equivalent of lithium at the polymer ends, hysteresis loss properties and breaking properties cannot be improved sufficiently. If the amount of tin compound exceeds 2.0 mole equivalents per 1 mole equivalent of lithium at the polymer ends, the molecular weight of the resulting polymers is very low and breaking properties are deteriorated. The tin compound can be added either all at once or in parts. Preferably, the level of tin compound is 0.3 to 1.2 mole equivalents per 1 mole equivalent of lithium at the active ends.

In the present invention, the time of addition of the tin compound is a very important factor on achieving the object of the invention. The tin compound is added during the propagation step at any time from just after initiation of polymerization until the conversion reaches 100%.

Any suitable hydrocarbon solvent may be used in the polymerization in accordance with the present invention. For example, the solvents may be: aromatic hydrocarbons such as benzene, toluene, xylene; aliphatic hydrocarbons such as n-pentane, n-hexane, n-butane; and cycloaliphatic hydrocarbons such as methylcyclopentane, cyclohexane, or mixtures of these.

Any suitable lithium compound may be used in the polymerization in accordance with the present invention. For example, the initiator may be: organolithium such as n-butyllithium, ethyllithium, propyllithium, t-butyllithium, hexyllithium, 1,4-dilithiobutane, the reaction product of butyllithium and divinylbenzene, phenyllithium, stilbendilithium; organometallithium such as tributyltin-lithium; lithiumamide such as lithiumdiethylamide, lithiumpyrrolidide. Preferably, the initiator is n-butyllithium or t-butyllithium. These lithium initiators may be used alone or as a mixture of two or more. The amount of the lithium compound may be 0.2 to 30 millimoles per 100 g of monomer.

Monomers for polymerization in accordance with the present invention include conjugated dienes and vinyl aromatic hydrocarbons.

Any suitable conjugated dienes may be used in the present invention. The conjugated dienes can preferably contain 4 to 12 carbon atoms, more preferably, 4 to 8 carbon atoms, such as 1,3-butadiene, isoprene, 2,3-dimethyl-1,3-butadiene, 1,3-pentadiene, octadiene. Preferably, the conjugated diene is 1,3-butadiene. These monomers may be used individually itself or as a mixture of 2 or more.

Any suitable vinyl aromatic hydrocarbons may be used in the present invention. The vinyl aromatic hydrocarbon preferably is styrene, α-methylstyrene, p-methylstyrene, o-methylstyrene, p-butylstyrene or vinyl naphthalene, and more preferably is styrene.

In the present invention, a Lewis base, such as an ether compound or a tertiary amine compound, can be used in order to improve polymerization activity and/or to control the molecular structure of the resulting polymer in order to prepare a polymer suitable for a particular use. The time of adding Lewis base is not critical.

Any suitable ether compound may be used in the present invention, including, for example, diethylether, dibutylether, tetrahydrofuran, 2-methoxytetrahydrofuran, 2-methoxyethyltetrahydrofuran, dioxane, ethyleneglycoldimethylether, ethyleneglycoldiethylether, ethyleneglycoldibutylether, diethyleneglycoldimethylether, diethyleneglycoldiethylether, diethyleneglycoldibutylether, triethyleneglycoldiethylether. Any suitable tertiary amine compound may be used in the present invention, including, for example, triethylamine, tripropylamine, pyridine, N,N,N',N'-tetramethylethylenediamine, N,N,N',N'-tetraethylethylenediamine, N-methylmorpholine.

The amount of the ether compound or the tertiary amine compound used is not critical and can be 0.05 to 1000 millimoles per 1 mole of organolithium.

In the present invention, generally any compound that reacts with the active ends of the polymer, and especially a silicon compound, a tin compound, a compound including an isocyanate group, and/or a compound having a —CM-N> linkage, where M represents a sulfur atom or an oxygen atom, can be added as a modifier to the reaction mixture after completing polymerization. The modifier can be added in an amount of 0.05 to 0.5 mole equivalent per charged initiator (which is to be described as "mol.eq./I"), more preferably, 0.1 to 0.2 mol.eq./l, or can be added when it is desired to quench polymerization or change the molecular structure of the resulting polymer in order to achieve desired properties in an amount of 0.05 to 0.5 mol.eq./l, more preferably, 0.1 to 0.2 mol.eq./l.

Any suitable silicon compound can be used in the present invention including, for example, halogenated silicon compounds such as silicon tetrachloride, halogenated organosilane compound, such as triethylsilane chloride, triphenylsilane chloride and dimethylsilane dichloride.

Any suitable tin compound can be used in the present invention, for example, halogenated tin compounds, such as tin tetrachloride, tin tetrabromide, halogenated organotin compounds, such as diethyltin dichloride, dibutyltin dichloride, tributyltin chloride, diphenyltin dichloride, triphenyltin chloride.

Any suitable compound containing an isocyanate group may be used in the present invention including, for example, aromatic polyisocyanate compounds, such as phenylisocyanate, 2,4-tolylenediisocyanate, 2,6-tolylenediisocyanate, diphenylmethanediisocyanate, naphthalenediisocyanate and dimers or trimers of these compounds.

Any suitable compound containing the —CM-N< linkage described above may be used in the present invention including, for example, amide compounds such as formamide, N,N-dimethylformamide, acetamide, N,N-diethylacetamide, aminoacetamide, N,N-dimethyl-N',N'-dimethylaminoacetamide, N,N-dimethylaminoacetamide, N,N-dimethyl-N'-ethylaminoacetamide, acrylamide, N,N-dimethylacrylamide, N,N-dimethylmethacrylamide, nicotinamide, isonicotinamide, picolinic acid amide, N,N-dimethylisonicotinamide, succinic acid amide, phthalic acid amide, N,N,N',N'-tetramethylphthalic acid amide, oxamide, N,N,N',N'-tetramethyloxamide, 1,2-cyclohexanedicarboxyimide, 2-furan carbonic acid amide, N,N-dimethyl-2-furan carboxylic acid amide, quinoline-2-carboxylic acid amid, N-ethyl-N-methylquinoline carboxylic acid amide; imide compounds such as succinic imide, N-methylsuccinic imide, maleimide, N-methylmaleimide, phthalimide, N-methylphthalimide; lactam compounds such as ε-caprolactam, N-methyl-ε-caprolactam, 2-pyrrolidone, N-methyl-2-pyrrolidone, 2-piperidone, N-methyl-2-piperidone, 2-quinorlone, N-methyl-2-quinorlone; urea compounds such as urea, N,N'-dimethyl urea, N,N-diethyl urea, N,N,N',N'-tetramethyl urea, N,N-dimethyl-N',N'-diphenyl urea, N,N'-dimethylethylene urea, carbamic acid derivatives such as methyl carbamate, N,N-dimethyl methyl carbamate; isocyanuric acid derivatives such as isocyanuric acid, N,N',N''-trimethylisocyanuric acid and the thiocarbonyl compounds corresponding to each carbonyl compound.

The reaction temperature in accordance with the invention is preferably −20° to 150° C., more preferably, 0° to 100° C.

Polymerization in accordance with the invention can be carried out batchwise or continuously.

The monomer concentration in the polymerization solvent is preferably 5 to 50 wt %, more preferably, 10 to 35 wt %.

If a mixture of a conjugated diene and an aromatic vinyl hydrocarbon is copolymerized, the aromatic vinyl hydrocarbon monomer is preferably 3 to 50 wt % of the feed monomer, more preferably 5 to 40 wt %, the conjugated diene being the remainder.

Polymerization in accordance with the invention is preferably carried out under high enough pressure, for example 1 to 10 atm., to maintain the system in liquid phase, since the reaction starts by contact of the monomer with the initiator in liquid phase. All the additives described above are preferably purified before use.

After the polymerization, solvent may be removed from the polymer by steam stripping or drying the polymer solution with hot rollers or reduced pressure with or without previously solidifying the polymers.

The polymers prepared in accordance with the present invention have a high tin-carbon linkage content, i.e., 20 wt % to 90 wt %, more preferably, 50 wt % to 80 wt %. The higher tin-carbon linkage content improves the properties of the resulting polymers.

Preferably, the number average molecular weight of the polymer in accordance with the invention is at least $10 \times 10^4$, more preferably, at least $20 \times 10^4$. The final molecular weight of total polymers including the high molecular weight polymers containing a tin-carbon linkage can be controlled easily according to particular uses, but generally, $5 \times 10^4$ to $150 \times 10^4$ are more useful.

The polymers in accordance with the present invention contain a tin atom which bounds to polymers or oligomers having different molecular weights in a chain. Any molecular weight can be obtained by changing the timing of adding the tin compound.

When a polymer in accordance with the invention is a butadiene rubber (BR) or an styrene-butadiene rubber (SBR), the microstructure of the BR or butadiene portion in the SBR may be cis-1,4-, trans-1,4-, or vinyl. Also in the SBR distribution of butadiene to styrene may be random, block or a mixture thereof, according to the particular use of the rubber.

The polymer obtained by the present invention, which, as mentioned above, may be an SBR can be the sole rubbery component of a rubber composition or can be blended with natural rubber (NR), or other synthetic rubbers. The polymer can be oil-extended, if desired, and vulcanized with conventional vulcanizing agents. Vulcanites of polymers in accordance with the invention are suitable for use as tires, rubber vibration isolators, belts, hoses, and for other industrial uses.

The present invention is explained in more detail through the examples, but is not limited to them.

In the examples, parts and percentages are by weight unless noted otherwise.

Measurements are made as follows:

The number average molecular weight of the polymers were measured by gel permeation chromatography (G.P.C. HLC-8020 manufactured by Toso with a series of two GMH-XL type columns) and calculated by differential refractive index (RI) and UV absorption at 254 nm reduced to polystyrene. A monodispersed styrene was used as a standard. The flow speed of tetrahydrofurane (THF) as a solvent was 1 ml/min. Temperature of the column and RI were 40° C. The data obtained were analyzed with an SC-8010 computer (manufactured by Tosoh Corporation).

The purification of the branched polymers having tin-carbon linkage ($P^1$–$P^2$ or >N–$P^2$ as discussed above) were carried out as follows:

At first, 1 g of the polymer was dissolved in 10 ml of toluene, then 0.2 ml of concentrated hydrochloric acid was added, finally the polymer was reprecipitated with methanol after being stirred for 20 minutes. By doing so, tin-carbon linkages were broken.

The microstructure of the BR or the SBR was analyzed by an infrared method according to D. Morero, Chem. e. Ind., Vol. 41, page 758 (1959). The amount of styrene was obtained from the calibration line of the infrared method based on the absorption of the phenyl group at 699 $cm^{-1}$.

There is more than one method to calculate lithium concentration at the active ends of the polymers but in this case, it was calculated as 68% of the feed lithium.

When organolithium initiator is used, even though the solvent and the other reagents used are purified beforehand, part of the initiator becomes deactivated by impurities, such as water and carbon dioxide, in the system.

In general, in the polymerization of conjugated dienes and/or vinyl aromatic hydrocarbons with an organolithium initiator, the molecular weight distribution is as narrow as 1.1 and the number average molecular weight (Mn) of the resulting polymer satisfies the following equation *(Experimental Method of Polymer Synthesis,* T. Ohtsu, page 212, Kagakudojin, 1972).

$$Mn = \text{(moles of the monomer/moles of the available organolithium initiator)} \times \text{(molecular weight of the monomer)} \quad \text{Equation A}$$

It has been found that equation A substantially holds in the polymerizations of the present invention. When solvents or monomers from the same lots are used in the same reactor, the concentration of organolithium initiator follows equation B.

$$\text{(Concentration of Li atoms at the active ends of the polymers)} = \text{(moles of available lithium initiator)} = \text{(moles of the organolithium compound charged at the beginning of the polymerization)} \times \text{(fraction of the remaining organolithium compounds)} \quad \text{Equation B}$$

This equation has been used industrially and empirically and has been proved to be valid objectively. So a series of experiments are carried out before starting the polymerization of the present invention and the lithium concentration at the active polymer ends is determined as 68%.

The index of the hysteresis loss values used was tanδ. The lower the index is, the more improved the low hysteresis loss property becomes. To measure tanδ, an apparatus for measurement of viscoelasticity (manufactured by Rheometrix Co.) was used. The conditions under which the measurement was carried out were a temperature at 50° C., strain at 1%, and frequency of 15 Hz. The tensile properties were measured according to Japanese Industrial Standard K6301. Mooney viscosity was measured at 100° C. with an L rotor.

EXAMPLE 1

(A) Preparation of dipyrrolidide tin

To obtain lithium pyrrolidide, 0.3 moles of pyrrolidine and 0.3 moles of hexane solution of n-butyl lithium were added to an argon purged glass vessel at room temperature while stirring (yield was 97%). 27.6 g of tin dichloride in 60 g of tetrahydrofuran were gradually added to 22.4 g of the lithium pyrrolidide to obtain bis(pyrrolidide)tin.

Obtained dipyrrolidide tin was identified by the chemical shifts of $^{119}$Sn-NMR using tetramethyl tin as a standard, $^{13}$C-NMR using 4d-THF as a standard and $^{1}$H-NMR using tetramethyl silane as a standard, and the molecular ion peak of GC-MS.

(B) Polymerization 1500 g of cyclohexane, 200 g of 1,3-butadiene, and 50 g of styrene were added to a 5 litter reactor having a stirring device. After the temperature in the reactor reached 60° C., 0.072 g of n-butyllithium was added to start polymerization. 0.143 g of dipyrrolidide tin was added 1 minute after n-butyllithium was added. The molar ratio of tin to available lithium was 1 to 1. At this moment, no change in viscosity was observed even though polymerization had been started. Polymerization was carried out at 60° C. for 120 minutes and was terminated with isopropanol.

Rubbery polymers were obtained by drying the solids at 100° C. with a hot roller after adding 2.5 g of 2,6-di-tert-butyl-p-cresol and then steam stripping. The properties of the resulting polymers are shown in Table 1.

A polymer composition was formulated as shown in Table 3 by mixing the polymer obtained with additives in a 250 ml Labprastomill, and 3 inch rolls, and then vulcanizing at 145° C. for 35 min. The properties of the resulting rubber composition are shown in Table 2.

EXAMPLE 2 AND 3

Examples 2 and 3 were carried out by the same method described in Example 1 except that the time of adding bis(pyrrolidide)tin was changed to after 5 minutes and after 15 minutes, respectively. The properties of the resulting polymers and polymer compositions are shown in Table 1 and Table 2, respectively.

EXAMPLE 4 AND 5

Examples 4 and 5 were carried out by the same method described in Example 1 except that the amount of bis(pyrrolidide)tin was changed to 0.098 g and 0.065 g, respectively. The molar ratios of tin to available lithium were 0.69 to 1 and 0.45 to 1, respectively. The properties of the resulting polymers and polymer compositions are shown in Table 1 and Table 2, respectively.

EXAMPLE 6

(A) Preparation of dihexamethyleneimide tin

To obtain lithium hexamethyleneimide, 0.3 moles of hexamethyleneimine and 0.3 moles of hexane solution of n-butyl lithium were added to an argon purged glass vessel at room temperature while stirring (yield was 97 %). 27.6 g of tin dichloride in 60 g of tetrahydrofuran were gradually added to 30.6 g of the lithium hexamethyleneimide to obtain bis(hexamethyleneimide)tin.

(B) Polymerization and compounding of resulting polymers

Polymerization and compounding of the polymers obtained were carried out by the same method described in Example 1 except that 0.173 g of dihexamethyleneimide tin was used instead of 0.143 g of bis(pyrrolidide)tin. The properties of the resulting polymer and resulting polymer composition are shown in Table 1 and Table 2, respectively.

Example 7

(A) Preparation of bis(diethylamide)tin

To obtain lithium diethylamide, 0.3 moles of diethylamine and 0.3 moles of hexane solution of n-butyl lithium were added to an argon purged glass vessel at room temperature while stirring (yield was 98%). 27.6 g of tin dichloride in 60 g of tetrahydrofuran were gradually added to 23.5 g of the lithium diethylamide to obtain bis(diethylamide)tin.

(B) Polymerization and compounding of resulting polymers

Polymerization and compounding of the polymers obtained were carried out by the same method described in Example 1 except that 0.145 g of bis(diethylamide)tin was used instead of 0.143 g of dipyrrolidide tin. The properties of the resulting polymer and resulting polymer composition are shown in Table 1 and Table 2, respectively.

COMPARATIVE EXAMPLE 1

Comparative Example 1 was carried out by the same method described in Example 1 except that in order to start polymerization, 1.20 g of tetrahydrofuran was added to the reactor and 0.114 g of n-butyl lithium was added. Polymerization was carried out at 60° C. for 120 min. and terminated with isopropanol. The properties of the resulting polymer and the resulting rubber composition are shown in Table 1 and Table 2, respectively.

Comparative Example 2

Comparative Example 2 was carried out by the same method described in Comparative Example 1 except that in order to start polymerization, 0.90 g of tetrahydrofuran was added to the reactor and 0.094 g of n-butyl lithium was added. Polymerization was carried out at 60° C. for 120 min. and terminated with isopropanol.

The properties of the resulting polymer and the resulting rubber composition are shown in Table 1 and Table 2, respectively.

TABLE 1

Properties of polymer

| | Molecular Weight ($\times 10^4$) | | | Contents (%) | | |
|---|---|---|---|---|---|---|
| | | Mw of polymer before addition of compound | Peak Top | | Vinyl Linkage | |
| | Mn of total polymer | | polymer with tin-carbon linkage | branched polymer | Polymer Containing Sn—C Linkage | in Butadiene Portion | Bound Styrene |
| E-1 | 30 | 2 | 57 | 18 | 81 | 39 | 21 |
| E-2 | 28 | 16 | 93, 60, 39[1)] | 31, 14[2)] | 70< | 38 | 20 |
| E-3 | 24 | 39 | 105, 60, 19[1)] | 46, 6[2)] | 60< | 40 | 22 |
| E-4 | 34 | 2 | 75 | 23 | 60 | 38 | 21 |
| E-5 | 32 | 2 | 86 | 28 | 42 | 36 | 21 |
| E-6 | 31 | 2 | 61 | 19 | 81 | 40 | 20 |
| E-7 | 32 | 2 | 60 | 18 | 80 | 41 | 21 |
| CE-1 | 19 | — | — | — | — | 40 | 21 |
| CE-2 | 27 | — | — | — | — | 40 | 20 |

E: Example
CE: Comparative Example
Mn: number average molecular weight
Mw: weight average molecular weight
[1)]: molecular weight of three main peaks in GPC chart
[2)]: molecular weight of two main peaks in GPC chart

TABLE 2

Properties of Vulcanizates

| | Elongation (%) | Tensile Strength (%) | tanδ at 50° C. | Mooney Viscosity |
|---|---|---|---|---|
| E - 1 | 403 | 240 | 0.082 | 70 |
| E - 2 | 418 | 251 | 0.084 | 72 |
| E - 3 | 431 | 238 | 0.087 | 73 |
| E - 4 | 417 | 236 | 0.091 | 67 |
| E - 5 | 428 | 233 | 0.097 | 63 |
| E - 6 | 410 | 238 | 0.083 | 70 |
| E - 7 | 426 | 240 | 0.090 | 63 |
| E - 1 | 378 | 208 | 0.130 | 50 |
| CE - 2 | 361 | 220 | 0.118 | 82 |

Notes:

TABLE 2-continued

Properties of Vulcanizates

| | Elongation (%) | Tensile Strength (%) | tanδ at 50° C. | Mooney Viscosity |
|---|---|---|---|---|

E: Example
CE: Comparative Example

TABLE 3

| Polymer | 100 parts |
|---|---|
| Carbon black (HAF) | 50 |
| Stearic acid | 2 |
| Spindle Oil | 5 |
| Antioxidant (6C*[1]) | 1 |
| $ZnO_2$ | 3 |
| Accelerator (DPG*[2]) | 0.5 |
| Accelerator (DM*[3]) | 1.0 |
| Sulfur | 1.5 |

TABLE 3-continued

| Polymer | 100 parts |
|---|---|

*[1]N-(1,3-dimethyl-butyl)-N'-phenyl-p-phenylenediamine
*[2]Diphenylguanidine
*[3]Dibenzothiazyldisulfide As shown in Table 1, polymers prepared in accordance with the present invention are polymers with high molecular weight and that contain higher amounts of tin-carbon linkages. The fact that these polymers have tin-carbon linkages is obvious because by treating these polymers with hydrochloric acid, the tin-carbon linkage was broken and branched polymers, as expected, were obtained. Also the polymers in accordance with the present invention may have branches having different molecular weights because polymers having different molecular weights appear after treatment with hydrochloric acid by choosing the timing of adding the tin compound. As shown in Table 1, when the tin compound was added right after the polymerization started Examples 1, 4–7), the molecular weight of each branch is about the same because there is only one peak in the GPC chart at $18 \times 10^4$ to $28 \times 10^4$.

In contrast when the tin compound was added at a certain time during the propagation (Examples 2 and 3) the GPC chart shows two peaks which correspond to the molecular weight of $P^1-P^2$ and $>N-P^2$ in equation 1 discussed above. From the molecular weight obtained from the GPC chart, the polymer prepared in accordance with Example 2 was identified as a mixture of three types of star-shaped polymers which have branches of $P^1-P^2$, $P^1-P^2$, $P^1-P^2$; $P^1-P^1$, $P^1-P^1$, $>N-P^2$; $P^1-P^2$, $>N-P^2$, $>N-P^2$; and $>N-P^2$, $>N-P^2$, $>N-P^2$. The fact that the molecular weight of the polymers prepared in accordance with the invention is as narrow as 1.5 to 1.7, even though these polymers grow in a "living" fashion indicates that the polymers in accordance with the present invention are mixtures as described above, and this gives the polymers prepared in accordance with present invention good processability.

Furthermore, as shown in Table 2, vulcanites of polymers according to the present invention have much better elongation, tensile strength and tanδ at 50° C., compared to polymers prepared in the Comparative Examples, and a smaller Mooney viscosity compared to Comparative Example 2. The fact that the polymer prepared in Example 3, in particular, has a higher molecular weight and still shows reduced Mooney viscosity compared to Comparative Example 2 indicates that the polymers in accordance with the present invention have better processability. And it is found that the vulcanites obtained in accordance with the present invention have reduced hysteresis loss values, and improved breaking properties and processability.

This is a tendency which can be seen in all cases without any relationship to the type of secondary amines (Examples 1, 6 and 7).

As described in this specification, a polymer containing a tin atom in the chain can be prepared having better breaking properties and reduced hysteresis loss values and better balanced properties without an additional coupling step.

Moreover, the method of the present invention provides polymers having reduced hysteresis loss, with good productivity.

While the invention has been described in detail and with reference to specific embodiments thereof, it is apparent to one skilled in the art that various changes and modifications can be made therein without departing from the spirit and scope thereof.

What is claimed is:

1. A process for preparing a polymer selected from the group consisting of a conjugated diene homopolymer, a conjugated diene-aromatic vinyl hydrocarbon copolymer and an aromatic vinyl hydrocarbon homopolymer in a hydrocarbon solvent, comprising the steps of: initiating polymerization of one or more monomers selected from the groups consisting of conjugated diene monomers and aromatic vinyl hydrocarbon monomers, with a lithium compound as an initiator, and adding a tin compound during propagation at any time from immediately after initiation until conversion reaches 100 %; wherein the amount of the tin compound is between 0.1 to 2 mole equivalents per 1 mole equivalent lithium at the active end of the polymer; wherein the tin compound has a formula selected from the group consisting of compounds of general formula (A) and general formula (B):

wherein $R^1$ and $R^2$ may be same or different and each represents an aliphatic hydrocarbon group containing 1 to 20 carbon atoms, an aromatic hydrocarbon group containing 5 to 20 carbon atoms or a cycloaliphatic hydrocarbon containing 3 to 20 carbon atoms;

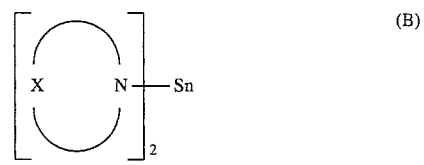

wherein X represents one of the following hydrocarbon groups:

X - I: a saturated group having the formula $(CR^3R^4)_n$ that forms a ring with the N in formula (B);

X - II: a saturated group having the formula $(CR^5R^6)_m$-Y-$(CR^5R^6)_l$ that forms a ring with the N in formula (B), wherein Y is $NR^7$ or O;

X -III: an unsaturated group having a carbon-carbon double bond that forms a ring with the N in formula (B);

wherein $R^3$, $R^4$, $R^5$, and $R^6$, which may be the same or different, each independently represents a hydrogen atom, an aliphatic hydrocarbon group containing 1 to 10 carbon atoms, an aromatic hydrocarbon group containing 5 to 10 carbon atoms, and a cycloaliphatic hydrocarbon group containing 3 to 10 carbon atoms, $R^7$ is an aliphatic hydrocarbon group containing 1 to 10 carbon atoms, an aromatic hydrocarbon group containing 5 to 10 carbon atoms, and a cycloaliphatic hydrocarbon group containing 3 to 10 carbon atoms, n is an integer between 3 and 10, and m and a l are each an integer, the sum of which is from 2 to 9.

2. The process according to claim 1, wherein the unsaturated group having a carbon-carbon double bond is represented by the formula $(CR^3R^4)_n$ or $(CR^5R^6)_m$-Y-$(CR^5R^6)_l$.

3. The process according to claim 1, wherein the tin compound is added immediately after initiation.

4. The process according to claim 1, wherein $R^3$ and $R^4$ each represents a hydrogen atom or an aliphatic hydrocarbon group containing 1 to 8 carbon atoms, and n is 3 to 10.

5. The process according to claim 1, wherein $R^3$ and $R^4$ each represents a hydrogen atom or an aliphatic hydrocarbon group containing 1 to 5 carbon atoms, and n is 3 to 8.

6. The process according to claim 1, wherein $R^5$ and $R^6$ each represents a hydrogen atom or an aliphatic hydrocarbon group containing 1 to 5 carbon atoms, $R^7$ represents an aliphatic hydrocarbon group containing 1 to 5 carbon atoms, and the sum of m and l is 3 to 5.

7. The process according to claim 1, wherein $R^5$ and $R^6$ each represents a hydrogen atom, and $R^7$ represents an aliphatic hydrocarbon group containing 1 to 5 carbon atoms, and the sum of m and l is 3 to 5.

8. The process according to claim 1, wherein the amount of the available initiator present during the initiating step is 0.2 to 30 millimoles per 100 g of monomer.

9. The process according to claim 1, wherein the conjugated diene monomer is butadiene.

10. The process according to claim 1, wherein the conjugated diene monomer is butadiene and the aromatic vinyl hydrocarbon monomer is styrene.

11. The process according to claim 1, wherein the conjugated diene monomer is a mixture of butadiene and isoprene and the aromatic vinyl hydrocarbon monomer is styrene.

12. The process according to claim 1, further comprising the step of adding a Lewis base to the mixture at any time after adding the tin compound.

13. The process according to claim 12, wherein the Lewis base is selected from the group consisting of an ether compound and a tertiary amine compound.

14. The process according to claim 12, wherein the Lewis base is added in an amount of 0.05 to 1000 millimoles per 1 mole of initiator.

15. The process according to claim 1, further comprising the step of modifying the polymer after the polymerization by contacting the polymer with at least one modifier selected from the group consisting of a silicon compound, a tin compound, a compound having an isocyanate group, and a compound having a —CM-N< linkage, where M represents a sulfur atom or an oxygen atom.

16. The process according to claim 15, wherein the modifier is a compound selected from the group consisting of a halogenated tin compound, a halogenated organotin compound, an aromatic polyisocyanate compound, an amide compound, an imide compound, a lactam compound, a urea compound, a carbamic acid derivative, an isocyanuric acid derivative, and a thiocarbonyl compound.

17. The process according to claim 15, wherein the modifier is a compound selected from the group consisting of tin tetrachloride, dibutyltin dichloride, tributyl tin chloride, phenylisocyanate, formamide, succinic imide, $\epsilon$-caprolactam, urea, carbamic acid, and isocyanuric acid.

18. The process according to claim 1, wherein the polymerization is carried out at a temperature of from $-20°$ to $150°$ C.

19. The process according to claim 1, wherein the polymerization is carried out at a solution monomer concentration of 5 to 50 wt %.

20. The process according to claim 1, wherein $R^1$ and $R^2$ each represents an aliphatic hydrocarbon group containing 1 to 10 carbon atoms, an aromatic hydrocarbon group containing 5 to 10 carbon atoms or a cycloaliphatic hydrocarbon containing 3 to 10 carbon atoms.

21. The process according to claim 1, wherein the lithium compound is selected from the group consisting of n-butyllithium, ethyllithium, propyllithium, t-butyllithium, hexyllithium, 1,4-dilithiobutane, the reaction product of butyllithium and divinylbenzene, phenyllithium, stilbendilithium, tributyltinlithium, lithiumdiethylamide and lithiumpyrrolidide.

22. The process according to claim 21, wherein the initiator is n-butyllithium or t-butyllithium.

* * * * *